United States Patent [19]

Tsukada

[11] Patent Number: 5,658,217
[45] Date of Patent: Aug. 19, 1997

[54] SHIFT SHOCK REDUCING SYSTEM FOR CONTINUOUSLY VARIABLE TRANSMISSION

[75] Inventor: Taiki Tsukada, Isehara, Japan

[73] Assignee: Nissan Motor Co., Ltd., Yokohama, Japan

[21] Appl. No.: 528,051

[22] Filed: Sep. 14, 1995

[30] Foreign Application Priority Data

Sep. 14, 1994 [JP] Japan .................................. 6-220053

[51] Int. Cl.$^6$ ...................................... B60K 41/04
[52] U.S. Cl. ....................... 477/109; 477/115; 477/43; 477/44
[58] Field of Search ....................... 477/37, 39, 43, 477/45, 46, 48, 107, 109, 110, 115

[56] References Cited

U.S. PATENT DOCUMENTS

| 4,353,272 | 10/1982 | Schneider et al. | 477/43 |
| 4,464,952 | 8/1984 | Stubbs | 477/37 X |
| 4,962,679 | 10/1990 | Ishikawa et al. | 477/68 X |
| 5,007,512 | 4/1991 | Petzold | 477/39 X |
| 5,031,481 | 7/1991 | Algrain et al. | 477/45 X |
| 5,150,635 | 9/1992 | Minowa et al. | 477/43 |
| 5,216,938 | 6/1993 | Yamaguchi | 477/107 |
| 5,323,667 | 6/1994 | Tweed et al. | 477/107 |
| 5,343,781 | 9/1994 | Minowa et al. | 477/107 |
| 5,385,516 | 1/1995 | Grange et al. | 477/107 |
| 5,466,199 | 11/1995 | Kobayashi et al. | 477/107 |
| 5,478,293 | 12/1995 | Yonezawa | 477/107 X |

*Primary Examiner*—Charles A. Marmor
*Assistant Examiner*—Saul Rodriguez
*Attorney, Agent, or Firm*—Foley & Lardner

[57] ABSTRACT

A shift shock reducing system for a continuously variable transmission detects power transmission ratio of the transmission. A shifting response delay of the transmission is determined depending upon a transmission speed ratio detected by a speed ratio detector. At a transition from a coasting state to a power-on driving state, a fuel recovery delay device issues a command for making a fuel cut-off device inoperative with a delay of a predetermined period derived on the basis of the shifting response delay set by a shifting response delay setting device, from detection of the transition by a driving condition transition detector, for synchronizing rising of the engine output with actual initiation of shifting of the transmission, associated with transition from coasting state to the power-on driving state, so as to effectively reduce the shift shock.

11 Claims, 8 Drawing Sheets

(a) Constant speed ratio (b) Constant engine torque

FIG_7

FIG_8

SHIFT SHOCK REDUCING SYSTEM FOR CONTINUOUSLY VARIABLE TRANSMISSION

BACKGROUND OF THE INVENTION

1. Field of the Invention

The present invention relates to a system for reducing shift shock upon shifting of an automatic power transmission associated with transition from coasting state with an accelerator pedal released to power-on driving state with the accelerator pedal depressed.

2. Description of the Related Art

A V-belt type or toroidal-type continuously variable transmission is constructed to determine a optimal power transmission ratio (speed ratio) at respective vehicular driving condition on the basis of a load condition of an engine (normally, throttle valve opening) and a vehicle speed at the current speed ratio of the transmission, and performs shifting toward the thus determined optimal transmission speed ratio.

Accordingly, under power-on transition from a coating state where an accelerator pedal is released to a power-on state where the accelerator pedal is depressed, the continuously variable transmission performs shifting of speed ratio (normally down shifting) in response to re-depression of the accelerator pedal.

Here, the magnitude of shift shock associated with shifting of the speed ratio is significantly affected as explained below in connection with an actual shifting initiation timing and a rising timing of the engine output in response to the accelerator pedal operation. Namely, when shifting of the automatic transmission has relatively high response in comparison with rising of the engine output, as can be appreciated from the output torque waveform of the transmission as shown by "a" in FIG. 5, since a torque converter is normally placed in lock-up state, dropping of torque is initially caused in response to shifting, and jerking shock is subsequently caused due to the rising of the engine output. Conversely, when the response of shifting in the power transmission is lower in comparison with the rising of the engine output, as can be appreciated from the output torque waveform shown by "b" in FIG. 5, since the torque converter is in the lock-up state, jerking shock is caused due to an abrupt rising of the engine output.

These problems of shift shock become significant since the continuously variable transmission permits an expansion of the lock-up range of torque converter in view of the transmission characteristics thereof, and employs the expanded lock-up range, and the engine in front of the transmission is normally equipped with a fuel cut-off system, which terminates fuel supply to the engine for improving the fuel economy during coasting of the vehicle.

Figure 5:
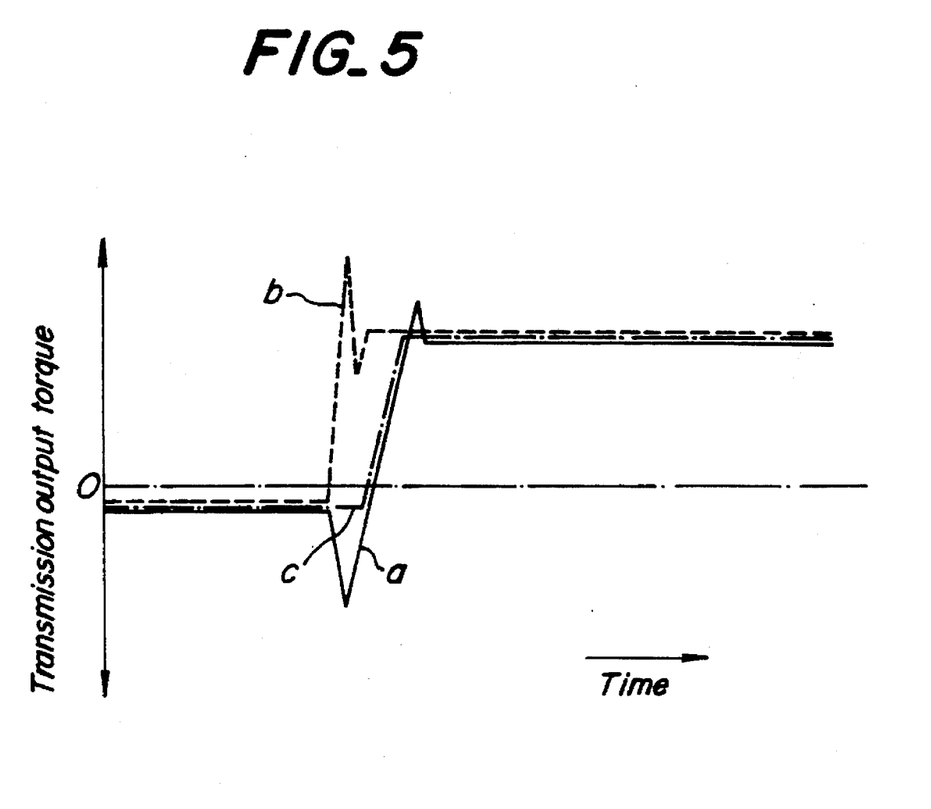
FIG. 5 is a chronographic timing chart showing the output torque of the transmission for explaining the difference between the case where rising of the engine output and the initiation of shifting are synchronized and the case where rising of the engine output and the initiation of shifting are not synchronized, at the transition from a coasting state to a power-on driving state.

On the other hand, when the rising of the engine output is synchronized with shifting of the automatic transmission, as can be appreciated from the waveform of the output torque of the transmission shown by "c" in FIG. 5, shift shock becomes small even at the lock-up condition of the torque converter since the drop of the torque due to shifting and rising of the engine output are canceled.

Figure 6:
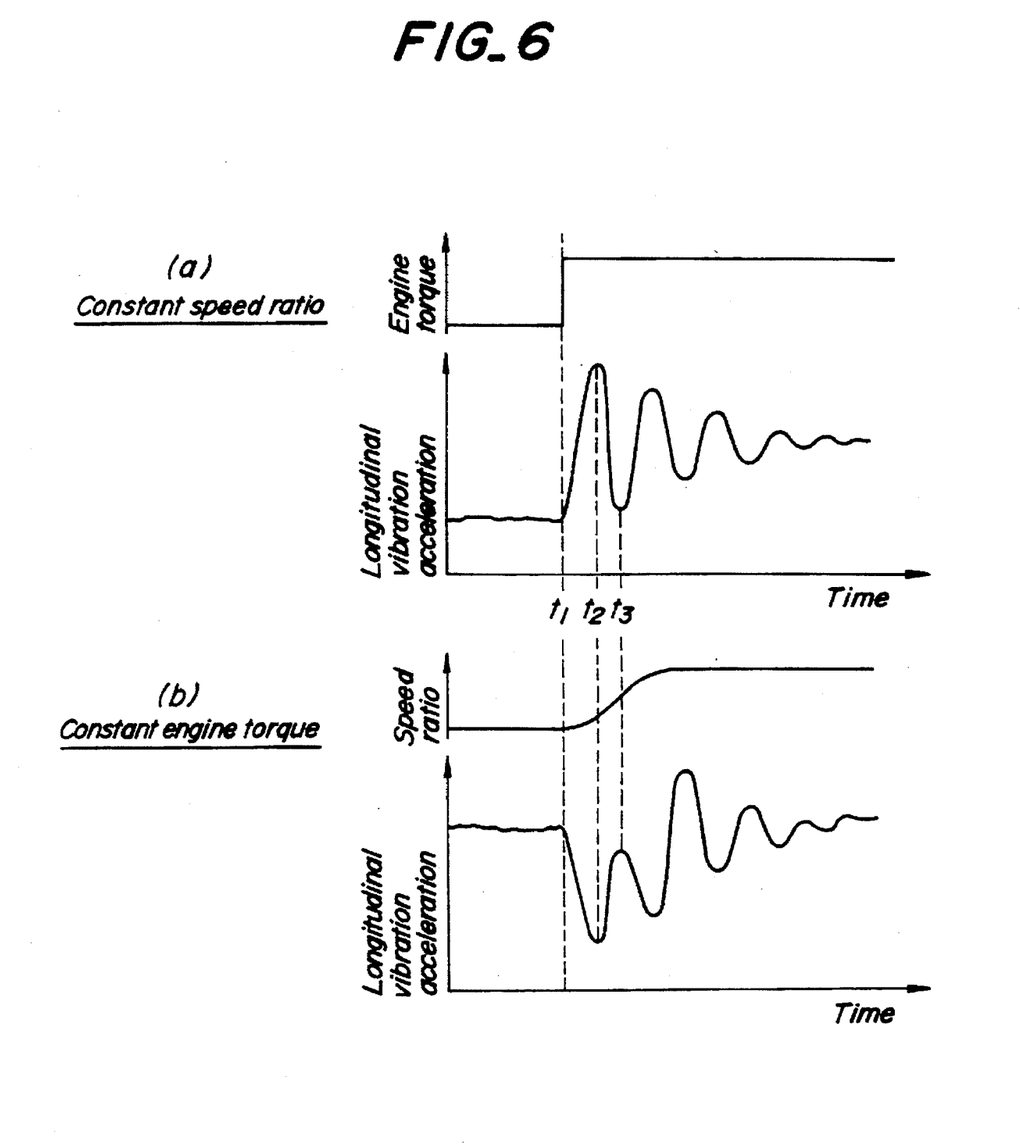
FIG. 6(a) is a timing chart showing the chronographic variation of an acceleration of the vehicular longitudinal vibration in the case where the engine output torque is varied with the speed ratio of the transmission maintained constant.
FIG. 6(b) is a timing chart showing the chronographic variation of the acceleration of the vehicular longitudinal vibration in the case where the speed ratio of the transmission is increased at the same timing to variation of the engine output torque in the chart of FIG. 6(a), with the engine output torque maintained constant.

Discussion will be given for the fact that the shift shock becomes small when the rising of the engine output and the down shifting of the automatic power transmission is synchronized. FIG. 6(a) shows a chronographical variation of acceleration of vehicular longitudinal vibration in the case where the engine output torque is increased stepwise at the moment $t_1$ with maintaining the speed ratio of the continuously variable transmission constant. It can be clearly appreciated that the acceleration of the vehicular longitudinal vibration due to increasing of the engine output torque rises at initiation timing of increasing the engine output torque. On the other hand, as can be appreciated from FIG. 6(b), which also shows the chronographical variation of the acceleration of the vehicular longitudinal vibration, when the speed ratio of the continuously variable transmission is increased by down shifting at the moment $t_1$ with maintaining the engine output torque constant, the acceleration of the vehicular longitudinal vibration is lowered from the initiation timing of increasing the speed ratio. Accordingly, variation characteristics of the acceleration of the vehicular longitudinal vibration in the former case of increasing the engine output torque and in the latter case of increasing the power transmission ratio change, the phase thereof becoming opposite in phase as can be appreciated from comparison during the period through timing of $t_1$, $t_2$ and $t_3$.

Figure 7:
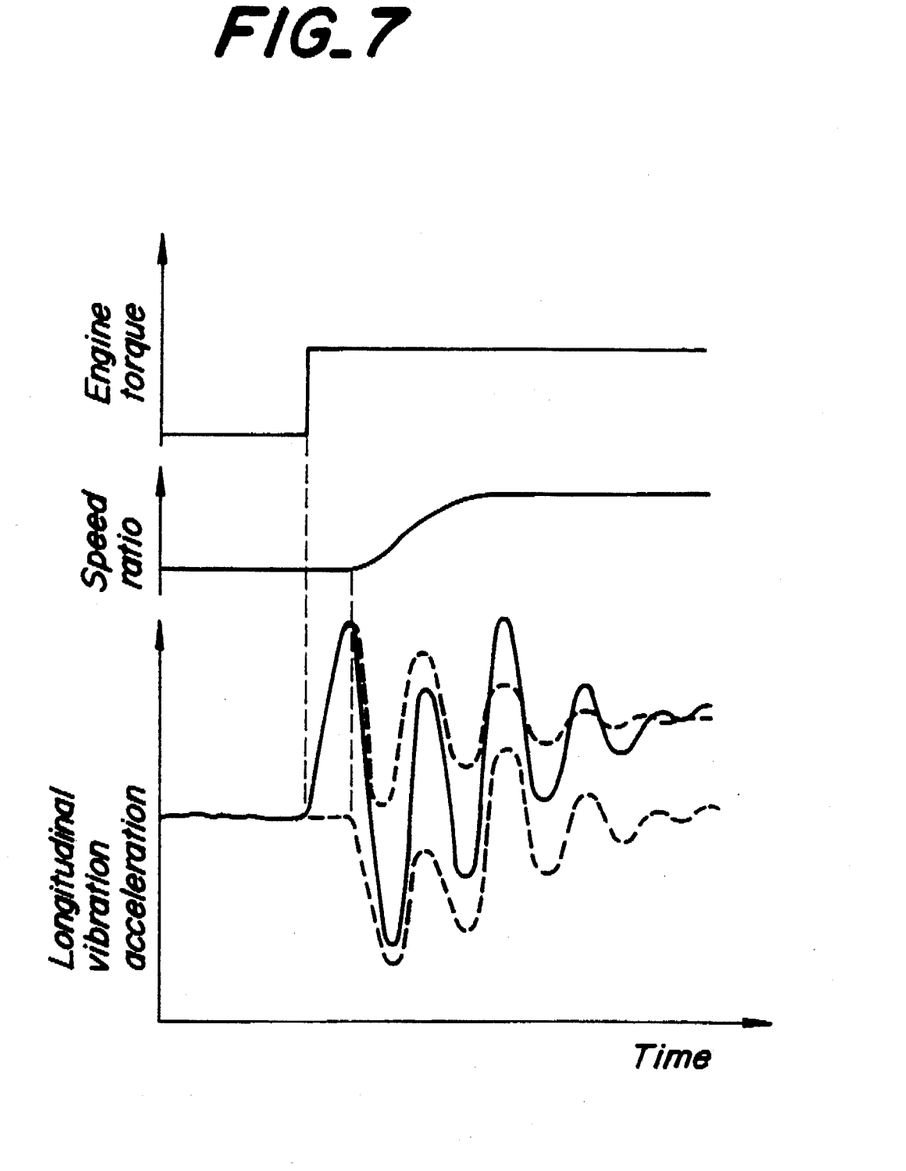
FIG. 7 is a timing chart showing the chronographic variation of the acceleration of the vehicular longitudinal vibration in the case where rising of the engine output torque and the increasing of the speed ratio of the transmission is not synchronized.
Figure 8:
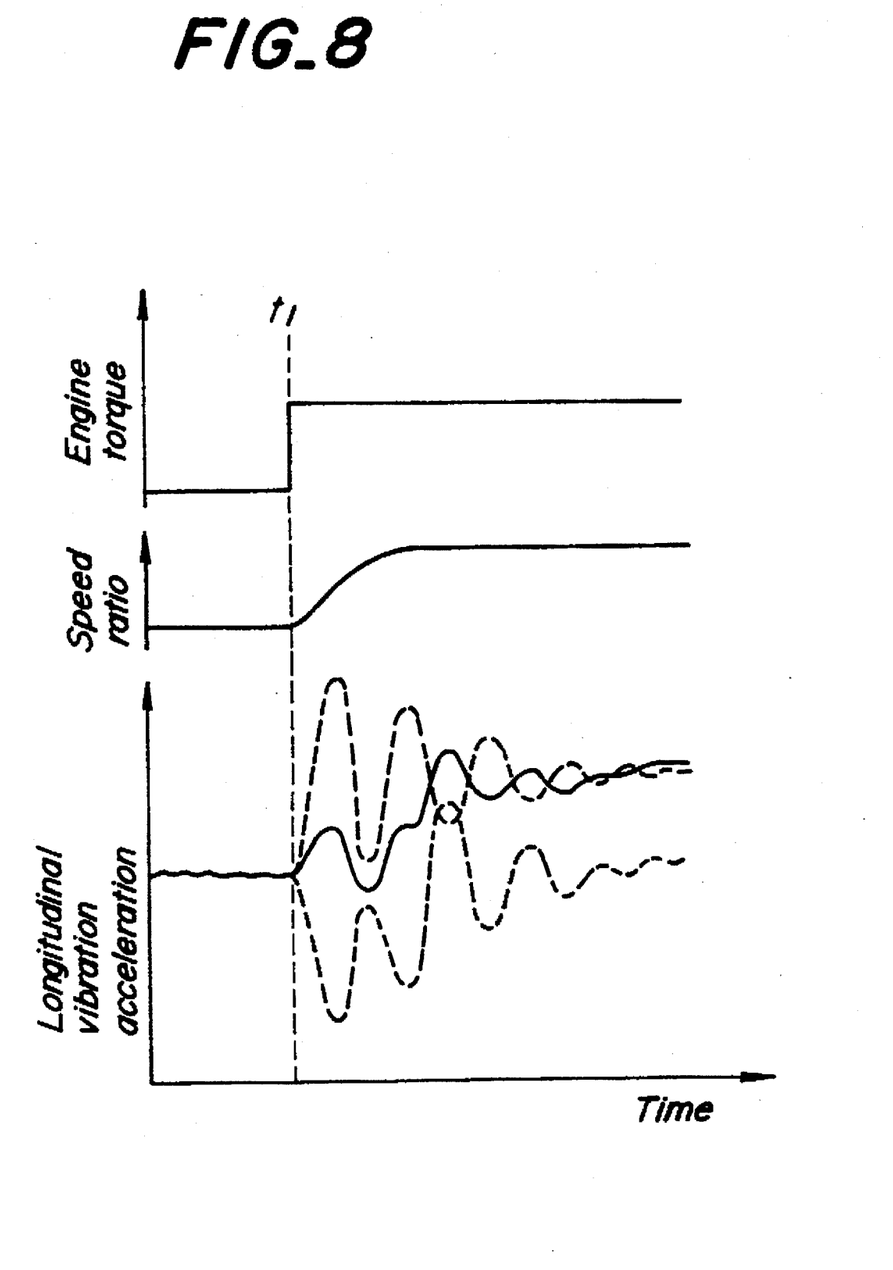
FIG. 8 is a timing chart showing the chronographic variation of the acceleration of the vehicular longitudinal vibration in the case where rising of the engine output torque and the increasing of the speed ratio of the transmission is synchronized.

Here, upon simultaneous occurrence of both phenomena in such a manner that they are not synchronized with each other, the composite acceleration of the vehicular longitudinal vibration becomes amplified to become greater, as shown by solid line in FIG. 7, to cause a large shift shock. In contrast, when both phenomena are synchronized, the composite acceleration of the vehicular longitudinal vibration becomes canceled for phase cancellation effect, as shown by the solid line in FIG. 8, to reduce the shift shock.

However, in practice, the conventional continuously variable transmission does not perform a control for establishing synchronization between rising of the engine output and shifting of the transmission. Moreover, it is quite unlikely that synchronization between rising of the engine output and shifting of the transmission is established, since the rising of the engine output associated with fuel recovery in response to termination of operation of the fuel cut-off system and shifting of the continuously variable transmission are caused with mutually independent lags in response. Particularly, the lag in response of shifting of the continuously variable transmission is much larger than the lag in response of rising of the engine output. Furthermore, the response lag in the shifting of the continuously variable transmission may be fluctuated depending upon the temperature of the working fluid and so forth. Accordingly, the conventional continuously variable transmission may cause a large shift shock at the transition from a coasting state to a power-on driving.

SUMMARY OF THE INVENTION

Therefore, it is an object of the present invention to provide a shift shock reducing system for a continuously variable transmission, in which synchronization of rising of an engine output and shifting of the transmission is established for reducing shift shock.

Another object of the invention is to provide a shift shock reducing system that can reduce shift shock at a power-on transition of the vehicle, wherein the vehicle driving condition is changed from a coasting state to a power-on driving state.

A further object of the present invention is to provide a shift shock reducing system for a continuously variable transmission, which can preliminarily set a response lag in shifting for establishing synchronization between shifting timing of the transmission and rising of the engine output, and which can make the set response lag variable depending upon a speed ratio with a higher precision of synchronization between the shifting timing of the transmission and rising timing of the engine output at any speed ratio.

According to one aspect of the invention, a shift shock reducing system for a continuously variable transmission, in a power unit including an engine with a fuel cut-off means for interrupting fuel supply during a coasting state, and the continuously variable transmission for transmitting an engine output power with a continuously variable speed ratio, comprises:

speed ratio detecting means for detecting the speed ratio of the transmission;

shifting response delay setting means for setting a shifting response delay of the transmission depending upon the speed ratio detected by the speed ratio detecting means;

driving condition transition detecting means for detecting a transition from a coasting state to a power-on driving state; and     fuel recovery delay means for issuing a command for making the fuel cut-off means inoperative with a delay of a predetermined period derived on the basis of the shifting response delay set by the shifting response delay setting means, after detection of the transition by the driving condition transition detecting means for synchronizing rising of the engine output with actual initiation of shifting of the transmission, associated with a transition from the coasting state to the power-on driving state.

The fuel recovery delay means may be constructed to issue a command for making the fuel cut-off system inoperative with a given period arithmetically derived on the basis of the shifting response delay set in the shifting response delay setting means, after detection of the transition by the driving condition transition detecting means, for initiating fuel recovery for an engine cylinder having the first ignition timing after expiration of a period corresponding to set shifting response delay from detection of the transition by the driving condition transition detecting means. In this instance, the shift shock reducing system may further comprise shifting command delay means for issuing a shifting command and thereby causing shifting of the transmission with a delay for a predetermined period arithmetically derived on the basis of the set shifting response delay from detection of the transition by the driving condition transition detecting means for actually causing shifting of the transmission at the first ignition at the engine cylinder having the first ignition timing after expiration of a period corresponding to set shifting response delay from detection of the transition by the driving condition transition detecting means.

The fuel recovery delay means may monitor an ignition period between engine cylinders until detection of the transition by the driving. condition transition detecting means, and predict the engine cylinder having the first ignition timing after expiration of a period corresponding to set shifting response delay from detection of the transition by the driving condition transition detecting means, on the basis of the result of monitoring.

The continuously variable transmission may be a V-belt type transmission. In this instance, the shifting response delay setting means may set a longer shifting response delay at the highest speed ratio than that at the other speed ratio.

The shift shock reducing system may further comprise time difference detecting means for detecting a time difference between a timing of rising of the engine output and a timing of initiation of shifting of the continuously variable transmission after detection of the transition state by the driving condition transition detecting means, and shifting response delay correcting means for correcting the shifting response delay set by the shifting response delay setting means for reducing the time difference.

According to another aspect of the invention, a shift shock reducing system for a continuously variable transmission is coupled with an automotive internal combustion engine having a fuel delivery system with a fuel cut-off function at an engine load condition satisfying a predetermined fuel cut-off condition, and comprises:

first means for setting a reference response delay period in view of possible delay of response in causing shifting of a speed ratio of the transmission;

second means for monitoring an engine operating condition and detecting a power-on transition, at which an engine load is abruptly increased from a condition satisfying a predetermined fuel cut-off condition;

third means responsive to the engine transition state indicative signal for deriving a transmission shifting timing delayed from occurrence of the engine transition state indicative signal for a first delay period derived on the basis of the reference response delay period; and     fourth means responsive to the engine transition state indicative signal for deriving a fuel recovery timing delayed from the occurrence of the engine transition state indicative signal for a second delay period derived on the basis of the reference response delay period, for synchronizing the fuel recovery timing with the transmission shifting timing.

In this instance, the shift shock reducing system may further comprise fifth means for deriving an error between the transmission shifting timing and the fuel recovery timing, for modifying the reference response delay period for maintaining the error within a predetermined allowable range. The first means may vary the reference response delay period depending upon instantaneous speed ratio of the transmission.

According to a further aspect of the invention, a shift shock reducing system for a continuously variable transmission is coupled with an automotive internal combustion engine having a fuel delivery system with a fuel cut-off function at an engine load condition satisfying a predetermined fuel cut-off condition, and comprises:

first means for setting a reference response delay period in view of possible delay of response in causing shifting of a transmission speed ratio of the transmission;

second means for monitoring an engine operating condition and detecting a power-on transition, at which an engine load is abruptly increased from a condition satisfying a predetermined fuel cut-off condition;

third means responsive to the engine transition state indicative signal for deriving a transmission shifting timing;

fourth means responsive to the engine transition state indicative signal for deriving a fuel recovery timing;

fifth means for providing a delay time at least for the fuel recovery timing delayed from the occurrence of the engine transition state indicative signal for a predetermined delay period derived on the basis of the reference response delay period, for synchronizing the fuel recovery timing with the transmission shifting timing.

In this instance, the shift shock reducing system may further comprise sixth means for deriving an error between the transmission shifting timing and the fuel recovery timing, for modifying the reference response delay period for maintaining the error within a predetermined allowable range. The first means may vary the reference response delay period depending upon instantaneous speed ratio of the transmission.

DETAILED DESCRIPTION OF THE PREFERRED EMBODIMENT

The present invention will be discussed hereinafter in detail with reference to the preferred embodiment shown in the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessarily obfuscate the present invention.

Basically, the present invention establishes synchronization between rising of an engine output torque and initiation of shifting at power-on transition, in which an engine operating condition is changed from a coasting state in which an accelerator pedal is released so that the vehicle runs by own inertia, and a power-on state in which the accelerator pedal is depressed to drive the vehicle by the engine output torque. The present invention is particularly directed to a vehicle drive system, in which an internal combustion engine has a fuel cut-off device responsive to the accelerator pedal in its fully or substantially fully released position to cut-off the fuel supply to the engine.

Figure 1:
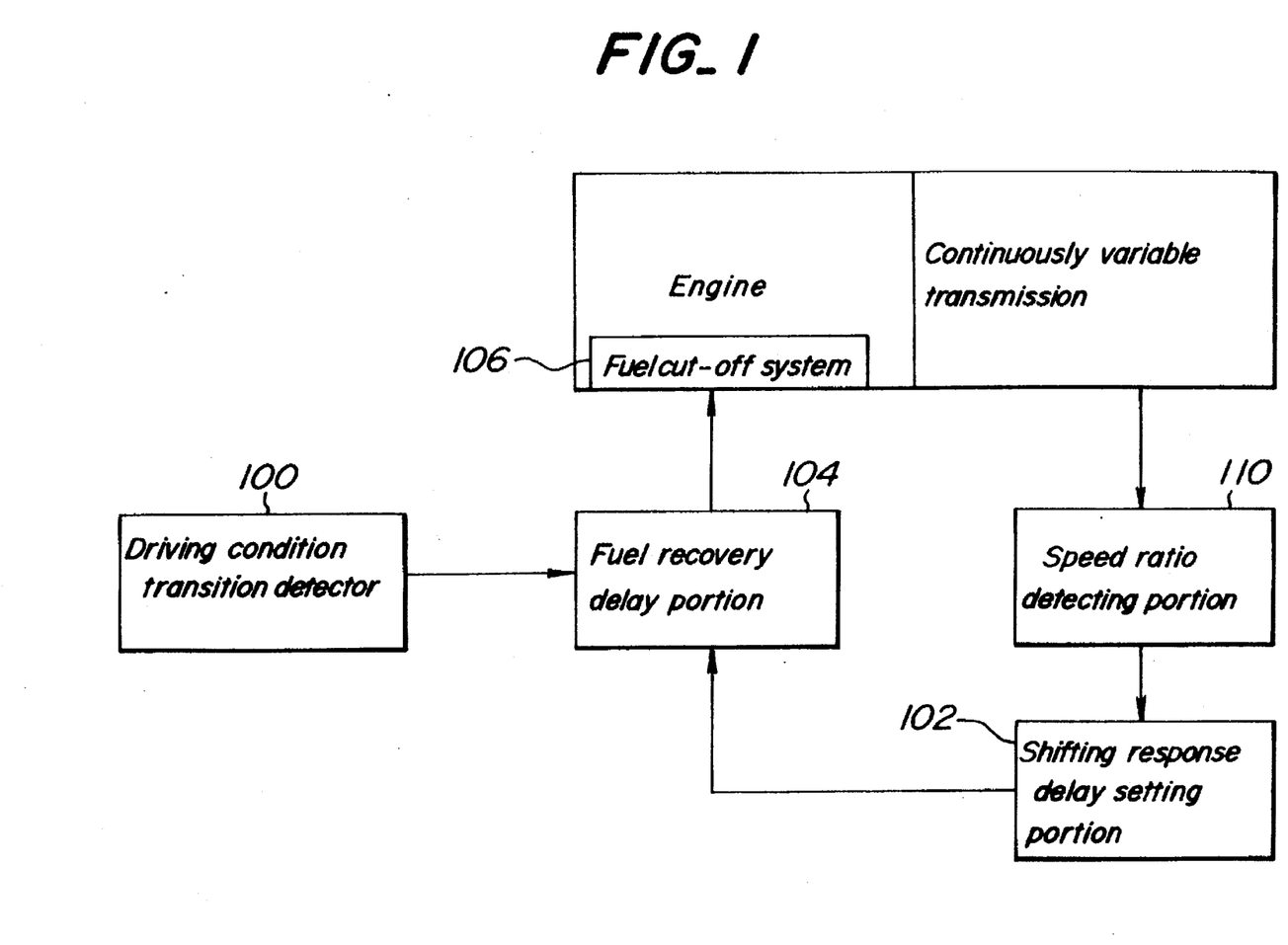
FIG. 1 schematic diagram showing the principle of the shift shock reducing system for a continuously variable transmission according to the present invention.

As shown in FIG. 1, the preferred embodiment of a shift shock reducing system for a continuously variable transmission of an automotive vehicle, includes a vehicular driving condition transition detector 100 that detects a transition of the vehicle driving state. In the illustrated embodiment, the vehicular driving condition transition detector 100 is particularly adapted to detect the transition state from the coasting state to the power-on driving state of the vehicle. The shift shock reducing system also includes a shifting delay setting portion 102, in which a response delay in shifting the speed ratio of the transmission is preliminarily set in view of possible response delay in actual shifting of the transmission speed ratio. The shift shock reducing system further includes a fuel recovery delay portion 104, which receives an output of the vehicular driving condition transition detector 100 indicative of detection of the power-on transition of the engine. The fuel recovery delay portion 104 also receives an output from the shifting delay setting portion 102 for providing a delay period corresponding to the set response delay of the transmission, in initiation of fuel recovery operation. In practice, the fuel recovery delay portion 104 is responsive to the output of the vehicular driving condition transition detector 100 indicative of detection of the power-on transition of the engine. The fuel recovery delay portion 104 serves to arithmetically calculate a fuel recovery delay period on the basis of the response delay of the transmission indicated as the output of the shifting delay setting portion 102, thereby to initiate the fuel recovery after expiration of the calculated fuel recovery delay period from a timing of detection of the power-on transition of the engine. In the fuel recovery operation, a fuel cut-off device 106 is disabled for terminating the fuel cut-off state of the engine and resuming the fuel supply for an engine cylinder having an ignition timing immediately after expiration of the fuel recovery delay period.

With the construction explained above, the shift timing of the continuously variable transmission can be substantially synchronized with the timing of initiation of the fuel recovery. Therefore, in this way, shift shock can be significantly reduced in the transmission during power-on transition. Such construction of the shift shock reducing system is disclosed in the commonly owned Japanese Patent Application No. 6-61116 which has been filed on Mar. 30, 1994. The disclosure of the above-identified Japanese patent application is herein incorporated by reference.

As can be appreciated from FIG. 1, the preferred embodiment of the shift shock reducing system according to the present invention, additionally includes a speed ratio detecting portion 110, which detects the current speed ratio of the continuously variable transmission and feeds the current speed ratio indicative signal to the shifting delay setting portion 102. The shifting delay setting portion 102 then varies the response delay period set by the shifting delay setting portion 102. In the continuously variable transmission, particularly in a V-belt type continuously variable transmission, the response delay period at the highest speed ratio is made significantly different from that at other speed ratio. Therefore, if the set response delay period is constant through all of the speed ratios, a precise synchronization between the fuel recovery timing and shifting timing of the continuously variable transmission cannot be established at certain transmission ratio. However, since the illustrated embodiment enables variation of the set response delay period of the transmission at any speed ratio thereof, synchronization between the fuel recovery timing and the transmission shift timing can be precisely established.

The preferred embodiment of the shift shock reducing system according to the present invention will be discussed below in greater detail with reference to FIGS. 2 to 4.

Figure 2:
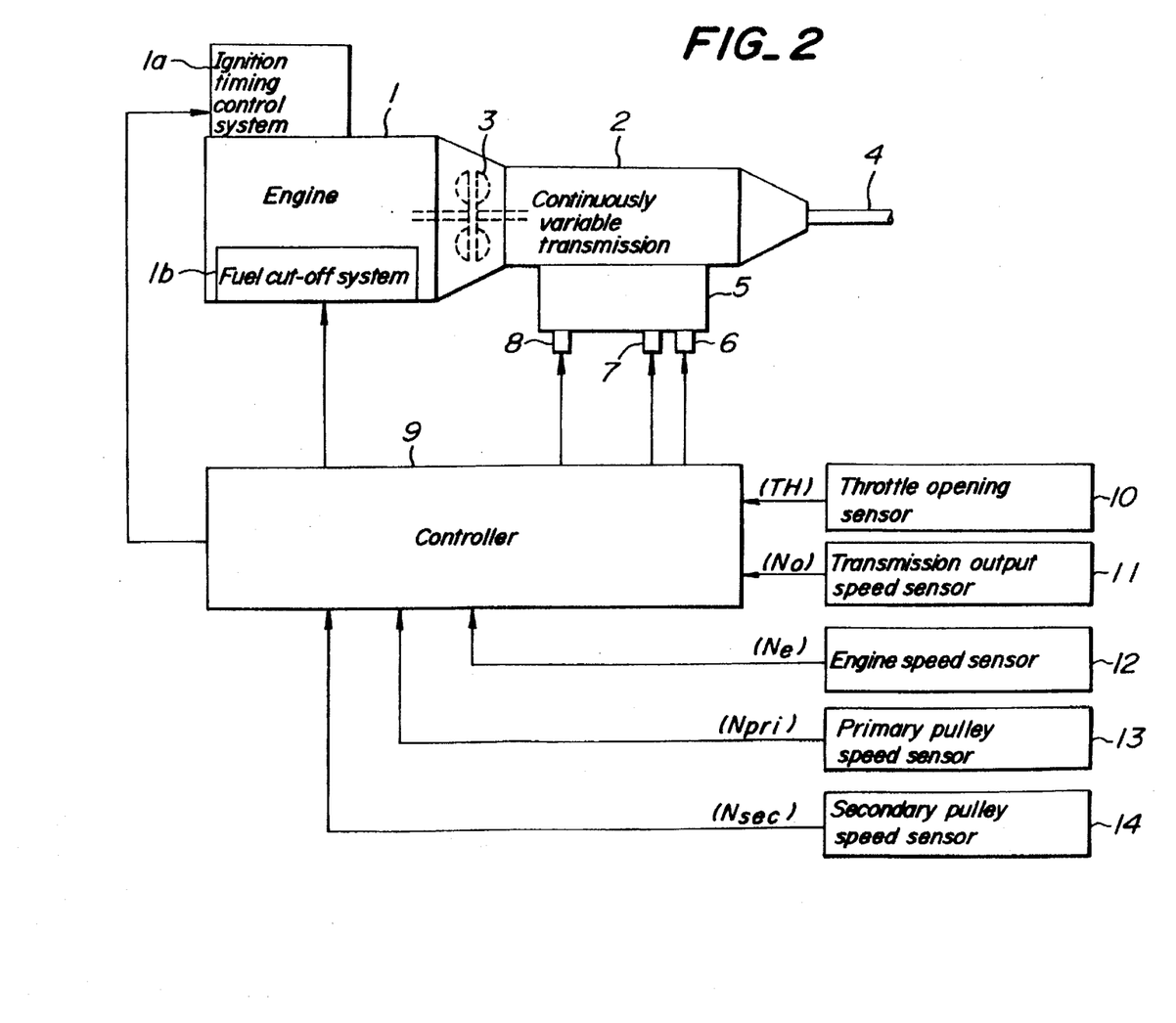
FIG. 2 is a block diagram showing a control system for a vehicular power unit, incorporating a preferred embodiment of the shift shock reducing system according to the present invention.

FIG. 2 shows the preferred embodiment of a shift shock reducing system for a continuously variable transmission according to the present invention. In FIG. 2, reference numeral 1 denotes an engine, and 2 denotes a V-belt type continuously variable transmission. The engine 1 and the transmission 2 are coupled in tandem fashion via a torque converter 3, to form a power unit of an automotive vehicle. The transmission 2 receives an output torque of the engine 1 via the torque converter 3 and changes the input speed depending upon a speed ratio into an output speed, which is then transmitted to an output shaft 4.

The engine 1 has a spark ignition timing control system 1a and a fuel cut-off system 1b. With these systems, spark ignition timing control and fuel cut-off control are performed in the normal way. On the other hand, the continuously variable transmission 2 assumes a speed ratio determined by shift solenoids 6 and 7 in a control valve 5 in a stepless manner. The operational state of the torque converter 3 is variable between a converter state in which the input and output elements thereof are not directly or mechanically coupled with each other, and a lock-up state in which the input and output elements are directly or mechanically couple for direct transmission of the engine output torque, under a duty control of a lock-up solenoid 8 in the control valve 5.

Control of the ignition timing control system 1a, control of the fuel cut-off system 1b, control of the shift solenoids 6 and 7, and duty control of the lock-up solenoid 8 are executed by a controller 9. The controller 9 is supplied with a throttle opening signal from a throttle opening sensor 10 for detecting a throttle valve opening TH of the engine 1, a transmission output speed indicative signal from a transmission output speed sensor 11 for detecting a rotation speed No of the transmission output shaft 4, an engine speed signal from an engine speed sensor 12 for detecting an engine revolution speed Ne, a primary pulley speed indicative signal from a primary pulley speed sensor 13 for detecting rotation speed $N_{pri}$ of a primary pulley, which is an input side pulley of the transmission 2, a secondary pulley speed indicative signal from a secondary pulley speed sensor 14 for detecting a rotation speed $N_{sec}$ of a secondary pulley, which is an output side pulley of the transmission 2.

Based on these input signals, the controller 9 performs a control of the engine 1, a shift control of the transmission 2 and a lock-up control for the torque converter in the normal manner known, per se. At first, the manner of control for the engine 1 will be briefly discussed. The controller 9 calculates an optimal fuel supply amount, a spark ignition timing, a valve opening timing of the intake and exhaust valves, an exhaust gas recirculation rate and so forth, on the basis of the throttle opening TH, the transmission output speed No (vehicle speed) and the engine speed Ne detected by the sensors 10 to 12. The optimal ignition timing is attained by effecting ignition for a corresponding engine cylinder of the engine 1 via an ignition control system 1a, according to ignition control signal from the controller 9. In addition, the controller 9 detects the engine operating condition on the basis of the throttle opening TH and the transmission output speed No detected by the sensors 10 and 11 to determine whether the vehicle is in a coasting state. When coasting state of the vehicle is detected, the controller 9 issues a fuel cut-off control signal for operating the fuel cut-off system 1b to interrupt fuel supply (fuel cut-off) to improve of the fuel economy.

Next, shift control of the continuously variable transmission 2 will be briefly discussed. The controller 9 derives an optimal speed ratio at the current driving condition on the basis of the vehicle speed, which can be derived from the transmission output speed No detected by the sensor 11, and the throttle valve open angle TH as detected by the sensor 10, by a known table look-up method, for example. Then, in order to establish the optimal speed ratio, the controller 9 operates the shift solenoids 6 and 7 to vary the speed ratio of the transmission 2 toward the optimal speed ratio in a stepless manner.

Next, the lock-up control of the torque converter 3 will be briefly discussed. The controller 9 determines whether the current vehicular driving condition is in a lock-up range or a converter range defined by the throttle opening TH and the vehicle speed. On the basis of the result of judgment, the controller 9 determines the duty cycle of the lock-up control signal to perform a duty control of the lock-up solenoid 8 for selectively establishing the converter state and the lock-up state. The controller 9 further detects the engine operating condition on the basis of the throttle valve opening TH and the transmission output speed No detected by the sensors 10 and 11, to determine whether the vehicle is in a coasting state or not. When the coasting state of the vehicle is detected, the controller 9 operates the torque converter 3 to establish the lock-up state so as to prolong the fuel-cut period for a better fuel economy.

Figure 3:
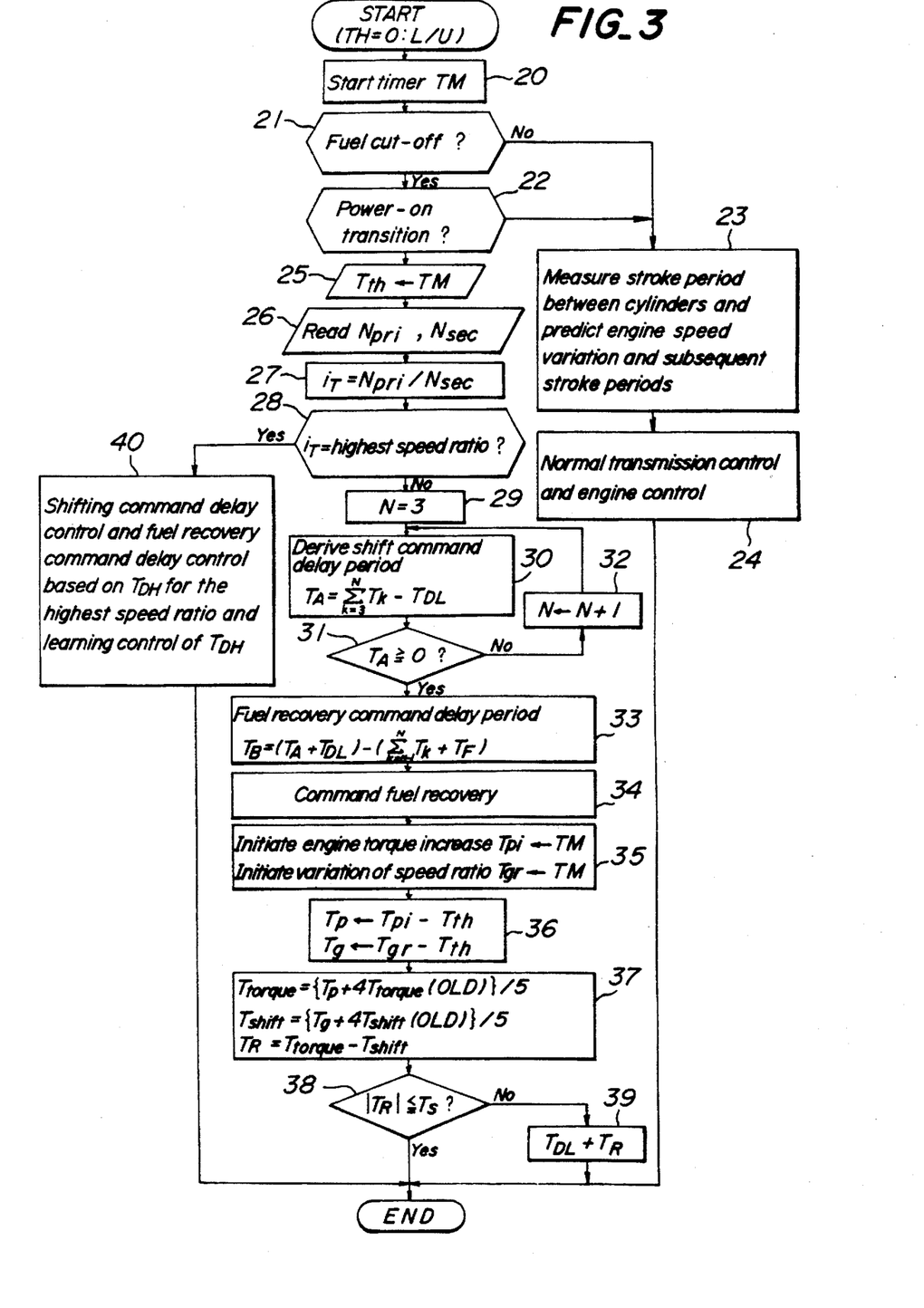
FIG. 3 is a flowchart showing a program for controlling delay of shifting command and delay of fuel recovery for reduction of shift shock in the preferred embodiment of the shift shock reducing system of FIG. 2.

In addition, the controller 9 executes a control program as illustrated in FIG. 3, taking also into account the primary pulley speed $N_{pri}$ and the secondary pulley speed $N_{sec}$ detected by the sensors 13 and 14, for reducing shift shock in down-shifting under power-on transition, in which the engine driving condition is switched from the coasting state with an accelerator pedal fully or substantially released, to a power-on state with the accelerator pedal depressed. The process of the shift shock reducing control will be discussed hereinafter.

The control program of FIG. 3 is triggered in response to entry into the coasting state by releasing of the accelerator pedal (the throttle valve open angle TH is substantially 0) and to subsequent establishing of the lock-up (L/U) state of the torque converter 3. At a first step 20, a timer TM is initiated for measurement of an elapsed time from the timing when the vehicle enters into the coasting state and the lock-up state of the torque converter 3 has been established. At a step 21, a judgment is made as to whether the engine 1 is in fuel cut-off state or not. At a step 22, which corresponds to a driving condition transition detector 100, a judgment is made as to whether the throttle opening TH is varied from the fully or substantially fully closed state to the open state or not. Namely, at this step, a judgment is made as to whether the vehicle driving condition is switched from the coasting state with the accelerator substantially released, to the power-on driving state with the accelerator pedal depressed.

Figure 4:
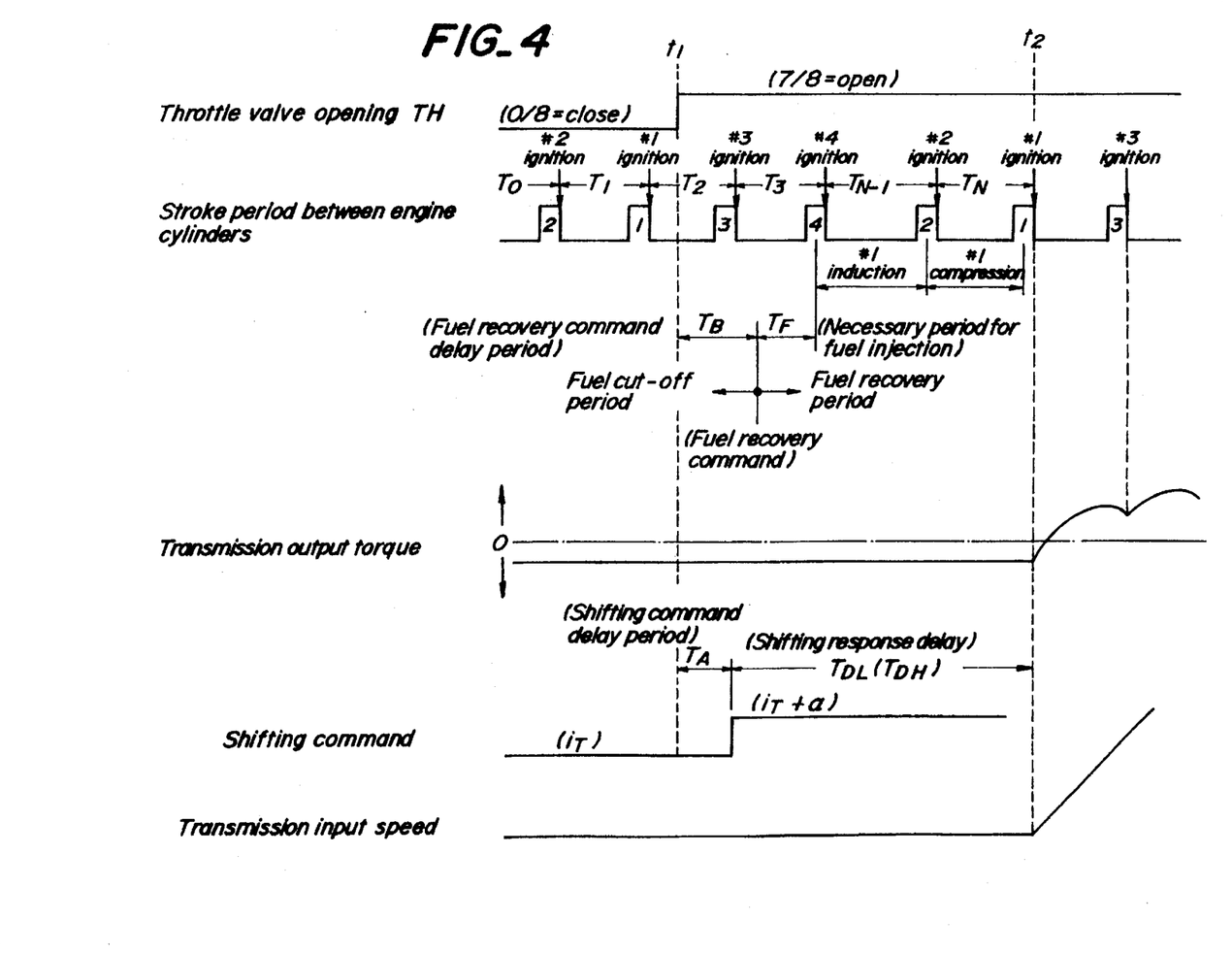
FIG. 4 is a timing chart showing shift command delay operation and a fuel recovery delay operation for reduction of shift shock.

When the coasting state is maintained while fuel cut-off is not effected, at a step 23, stroke periods $T_0$, $T_1$ between the engine cylinders as shown in FIG. 4 are measured. Then, on the basis of the measured stroke periods, engine speed variation is predicted to thereby predict subsequent stroke periods $T_2, T_3, T_4, \ldots$ between the cylinders. At a step 24, normal transmission control and the engine control are performed.

Here, prediction of the engine speed variation and prediction of the stroke periods are performed in the following manner. Namely, from the measured period $T_0$ and $T_1$, $T_1 + (T_1 - T_0)$ is calculated to predict the next stroke period $T_2$. In the similar manner, subsequent stroke periods $T_3, T_4, \ldots$ are predicted. In practice, the prediction of the stroke period is performed for future period of approximately 100 ms.

When power-on transition is ceased by depression of the accelerator pedal from its released state under the fuel cut-off state, the process is advanced to the control through steps 25, 26 and 27. At the step 25, the value of the timer TM at the timing where the engine driving condition is changed to the power-on state from the coasting state, namely the elapsed time from the initiation of the coasting state corresponding to the initiation timing of the control program of FIG. 3 to the initiation of power-on state driving is set as a transition timing $T_{th}$. Then, at the step 26, the primary pulley speed $N_{pri}$ and the secondary pulley speed $N_{sec}$ are read. Then, at the step 27, which corresponds to a transmission speed ratio detecting means, a transmission speed ratio i is calculated through $i_T = N_{pri}/N_{sec}$.

At a step 28, which corresponds to the response delay setting portion 102, a judgment is made as to whether the transmission speed ratio derived at the step 27 is the highest speed ratio, or other intermediate speed ratio. If the speed ratio is judged to be the intermediate speed ratio, the process is advanced to steps 29 through 39 to perform a shift command delay control, and a fuel recovery command delay control on the basis of a shifting response delay TDL for the intermediate speed ratio, as well as a learning control of the shifting response delay $T_{DL}$.

Namely, through steps 29 to 32, a shift command delay period $T_A$ is calculated. Upon calculation of the shift command delay period $T_A$, if the shift response delay set for the intermediate transmission speed ratio is as $T_{DL}$ in FIG. 4, using the predicted stroke periods $T_3, \ldots$ ($T_3, \ldots$ is taken in the case of FIG. 4 for the sake of easy understanding) as predicted at the step 23, the shift command delay period $T_A$ may be expressed by:

$$T_A = [(T_3 + T_4 + \ldots T_{N-1} + T_N) - T_{DL}]$$

At the step 29, an initial setting is performed so that $T_A$ is initially set at a minimum value in positive value. Subsequently, until $T_A \geq 0$ is detected at the step 31, a final value of N, which is incremented at the step 32 (N=5 in case of FIG. 4), is obtained. It should be noted that the initial value of N set at the step 29 is assumed to be 3 taking the example of FIG. 4 and k at the step 30 is also assumed to be 3, for the sake of easy understanding. Through calculation of the foregoing equation on the basis of N, the shift command delay period $T_A$ is derived.

Here, it can be appreciated from FIG. 4, that the shift command delay period $T_A$ represents a delay period of a shift command with respect to transition timing $t_1$ from the coasting state to the power-on driving state so as to synchronize the shift initiation timing with the ignition timing $t_2$ of the engine cylinder (No. 1 cylinder in FIG. 4), which is the cylinder to have the first ignition timing after expiration of the shift response delay $T_{DL}$ from power-on transition timing $t_1$, namely to the rising timing of the engine output upon power-on transition.

Next, at a step 33, a fuel recovery command delay period $T_B$ is calculated. Assuming a period required for the fuel injection to be $T_F$ as shown in FIG. 4, the fuel recovery command delay period $T_B$ is expressed by:

$$T_B = [(T_A + T_{DL}) - (T_{N-1} + T_N + T_F)]$$

Here, it can be also appreciated from FIG. 4, that the fuel recovery command delay period $T_B$ represents the delay period for the fuel recovery command with respect to the transition timing from the coasting to the power-on driving for certainly rising the engine output at the ignition timing $t_2$ of the engine cylinder (No. 1 cylinder of FIG. 4), which is the cylinder having the first ignition timing after expiration of the shift response delay $T_{DL}$ for the intermediate power transmission ratio from power-on transition timing $t_1$.

As shown in FIG. 4, at a next step 34, after expiration of the respective delay periods $T_A$ and $T_B$ derived from the transition initiation timing $t_1$ from the coasting state to the power-on driving state, a down-shifting command for achieving a down-shifting from the current power transmission ratio $i_T$ to a next power transmission ratio $i_{T-\alpha}$, and a fuel recovery command are issued. By such a manner of fuel recovery, as can be appreciated from the waveform of transmission output torque, after expiration of the shifting response delay $T_D$ from the transition timing $t_1$ from the coasting state to the power-on driving state, the engine output can be certainly raised at the ignition timing $t_2$ of the engine cylinder (No. 1 cylinder of FIG. 4), which is the cylinder having the first ignition timing after expiration of the shifting response delay $T_D$ from the transition timing $t_1$ from the coasting state to the power-on driving state. Also, with the shifting command delayed as explained above, initiation of shifting can be certainly synchronized with the timing $t_2$ of rising of the engine output. Accordingly, the torque drop and jerking upon shifting discussed with respect to FIG. 5, shift shock can be reduced. Also, with the phase cancellation effect as discussed with respect to FIGS. 6 to 8, shift shock can be reduced. In addition, since the shift command delay period $T_A$ and the fuel recovery command delay period $T_B$ are determined on the basis of the shifting response delay $T_{DL}$ specifically set for the currently selected intermediate speed ratio of the transmission 2, the delay periods $T_A$ and $T_B$ can be set to accurately correspond to the current vehicle driving condition even for the transmission 2 having different shifting response delays at the highest transmission speed ratio and other intermediate speed ratio. Thus, the engine output can be raised in synchronism with initiation of shifting of the transmission even at the intermediate speed ratio.

As set forth, the steps 30 and 34 correspond to the shift command delay means, and steps 33 and 34 correspond to the fuel recovery command delay means.

It should be noted that while the fuel recovery command and the shift command are delayed with respect to the timing $t_1$ upon depression of the accelerator pedal in the foregoing embodiment, since the shifting response delay $T_{DL}$ is longer than a fuel injection period $T_F$, substantially equivalent effect can be attained by making the engine output rising timing closer to the shifting initiation timing by maintaining the shifting command not delayed and causing delay only in the fuel recovery timing, though the precision may be somewhat lower than the former embodiment. However, since the control can be simplified, such a modified construction is advantageous from the viewpoint of cost.

Steps 35 through 39 correspond to the process for making correction of the shifting response delay $T_{DL}$ derived as explained above when the actual shifting response delay is varied depending upon variation of the condition, by a learning control for adapting the shifting response delay to variation of the actual shifting response delay. At the step 35, when rising of the engine output torque is initiated (at the timing of spark ignition of the No. 1 cylinder in case of FIG. 4), the value of the timer TM is set as the timing $T_{pi}$ for initiating rising of the engine output, and the value of the timer TM is set as the timing $T_{gr}$ for initiating variation of the speed ratio (at a timing where variation of the speed ratio from $i_T$ derived at the step 27 to $i_T+\alpha$). Next, at the step 36, by subtracting $T_{th}$ set at the step 25 from $T_{pi}$, after transition from the coasting state to the power-on driving state, a period $T_p$ to initiate rising of the engine output torque is calculated. Also, by subtracting $T_{th}$ set at the step 25 from $T_{qr}$, the period $T_g$ after transition from the coasting state to the power-on driving state to initiate shifting is calculated.

Next, at the step 37, which corresponds to the time difference detecting means, an averaging operation is performed for removing abnormal data in the period $T_p$ and $T_q$. In the averaging operation, a sum of $T_p$ derived as set forth above and an integer multiple (4 times in the shown example) of the averaged value $T_{torque}$ (OLD) calculated in the immediately preceding calculation cycle is calculated. Then, the sum is divided by a multiple +1. In this way, the averaging operation is performed with respect to $T_p$ to derive new $T_{torque}$. Averaging operation for $T_q$ is performed in the similar manner. Namely, a sum of $T_q$ derived as explained above and an integer multiple (4 times in the shown example) of the averaged value $T_{shift}$ (OLD) calculated in the immediately preceding calculation cycle is calculated. Then, the sum is divided by a multiple +1. In this way, the averaging operation is performed with respect to $T_q$ to derive new $T_{shift}$. Then, a difference $T_R$ between the average value $T_{torque}$ relating to a period to initiate rising of the engine output torque after transition from the coasting state to the power-on driving state and the average value $T_{shift}$ relating to a period to initiate shifting after transition from the coasting state to the power-on driving state is derived. This difference represents an error between initiation of rising of the engine output torque and initiation of shifting. Therefore, when this difference becomes larger, shift shock reduction effect becomes lower.

At the step 38, a judgment is made as to whether the difference $T_R$ is less than or is less than or equal to an allowable set value $T_s$ (for example 10% of period of vehicular longitudinal vibration) or not. If the difference $T_R$ exceeds the allowable set value $T_s$, at the step 39, which corresponds to the shifting response delay correction means, the shifting response delay $T_{DL}$ set for the intermediate speed ratio is corrected to make it greater by an amount corresponding to the difference $T_R$. By this correction, even when the actual shifting response delay at the intermediate speed ratio is varied due to variation of the condition, the shifting response delay $T_{DL}$ to be set can follow such variation. Therefore, the shifting response delay $T_{DL}$ can be always set to be adapted to the current condition so that shift shock reduction effect can be certainly attained irrespective of variation of the condition.

When it has been judged that the current speed ratio of the transmission 2 corresponds to the highest speed ratio, the shifting command delay control and the fuel recovery control on the basis of the shifting response delay $T_{DH}$ set for the highest speed ratio, as well as a learning control of the shifting response delay $T_{DH}$ for the highest speed ratio are performed at a step 40, in substantially the same manner as that for the intermediate speed ratio. It should be noted that the shifting response delay $T_{DH}$ for the highest speed ratio is set to be longer than the shifting response delay $T_{DL}$ for the intermediate speed ratio, in view of the fact that the actual shifting response delay at the highest transmission speed ratio is longer than that at the intermediate speed ratio.

It will be appreciated that the above-described preferred embodiment of the present invention is featured by differentiating the shifting response delay to be used for determining the shifting command delay period and the fuel recovery command delay period depending upon the current transmission speed ratio, such as to set at relatively long $T_{DH}$ when the speed ratio of the transmission 2 is the highest transmission speed ratio, and to set at relatively short $T_{DL}$ when the speed ratio is intermediate ratio other than the highest transmission speed ratio. Therefore, even for the continuously variable transmission that varies the actual shifting response delay depending upon the transmission speed ratio, the shifting initiation timing can be certainly synchronized with initiation timing of rising of the engine output torque irrespective of the speed ratio of the transmission, making it possible to effectively reduce the shift shock.

While the present invention has been described above with reference to a specific preferred embodiment, it has been presented by way of example only and various modifications and variations may be made without departing from the scope of the invention as defined by the appended claims.

I claim:

1. A shift shock reducing system for a continuously variable transmission powered by an engine with a fuel cut-off means for interrupting fuel supply during a coasting state, wherein the continuously variable transmission is controllable to transmit engine power output from the engine with a continuously variable speed ratio, the system comprising:

speed ratio detecting means for detecting the speed ratio of said transmission;

shifting response delay setting means for setting a shifting response delay of said transmission depending upon the speed ratio detected by said speed ratio detecting means;

driving condition transition detecting means for detecting a transition from a coasting state to a power-on driving state; and fuel recovery delay means for issuing a command for making said fuel cut-off means inoperative for a predetermined period derived on the basis of said shifting response delay set by said shifting response delay setting means, after detection of said transition from the coasting state to the power-on driving state by said driving condition transition detecting means for synchronizing rising of said engine output with actual initiation of shifting of said transmission.

2. A shift shock reducing system as set forth in claim 1, wherein said fuel recovery delay means issues a command for making said fuel cut-off system inoperative for said predetermined period, which is arithmetically derived on the basis of said shifting response delay set in said shifting response delay setting means, after detection of said transition by said driving condition transition detecting means, for initiating fuel recovery for an engine cylinder having a first ignition timing after expiration of a period corresponding to set shifting response delay, from detection of said transition by said driving condition transition detecting means.

3. A shift shock reducing system as set forth in claim 1, further comprising shifting command delay means for issuing a shifting command for delaying shifting of said transmission for a predetermined period, which is arithmetically derived on the basis of said set shifting response delay, from detection of said transition by said driving condition transition detecting means, for actually causing shifting of said transmission at a first ignition at an engine cylinder having a first ignition timing after expiration of a period corresponding to set shifting response delay, from detection of said transition by said driving condition transition detecting means.

4. A shift shock reducing system as set forth in claim 2, wherein said fuel recovery delay means monitors an ignition period between engine cylinders until detection of said transition by said driving condition transition detecting means, and predicts the engine cylinder having the first ignition timing after expiration of a period corresponding to said set shifting response delay from detection of said transition by said driving condition transition detecting means, on the basis of the result of monitoring.

5. A shift shock reducing system as set forth in claim 1, wherein said continuously variable transmission is a V-belt type transmission, and said shifting response delay setting means sets a longer shifting response delay at a highest transmission speed ratio than that at other speed ratios.

6. A shift shock reducing system as set forth in claim 1, further comprising time difference detecting means for detecting a time difference between a timing of rising of the engine output and a timing of initiation of shifting of said transmission after detection of said transition state by said driving condition transition detecting means, and shifting response delay correcting means for correcting said shifting response delay set by said shifting response delay setting means for reducing said time difference.

7. A shift shock reducing system for a continuously variable transmission coupled with an automotive internal combustion engine having a fuel delivery system with a fuel cut-off function at an engine load condition satisfying a predetermined fuel cut-off condition, the system comprising:

first means for setting a reference response delay period in view of possible delay of response in causing shifting of a speed ratio of said transmission;

second means for monitoring an engine operating condition and detecting a power-on transition, at which an engine load is abruptly increased from a condition satisfying a predetermined fuel cut-off condition;

third means responsive to the detection of said power-on transition for deriving a transmission shifting timing delayed from the detection of said power-on transition for a first delay period derived on the basis of said reference response delay period; and fourth means responsive to the detection of said power-on transition for deriving a fuel recovery timing delayed from the detection of said power-on transition for a second delay period derived on the basis of said reference response delay period, for synchronizing said fuel recovery timing with said transmission shifting timing.

8. A shift shock reducing system as set forth in claim 7, further comprising fifth means for deriving an error between said transmission shifting timing and said fuel recovery timing, for modifying said reference response delay period for maintaining said error within a predetermined allowable range.

9. A shift shock reducing system as set forth in claim 7, wherein said first means varies said reference response delay period depending upon the speed ratio of said transmission.

10. A shift shock reducing system for a continuously variable transmission coupled with an automotive internal combustion engine having a fuel delivery system with a fuel cut-off function at an engine load condition satisfying a predetermined fuel cut-off condition, comprising:

first means for setting a reference response delay period in view of possible delay of response in causing shifting of a speed ratio of said transmission;

second means for monitoring an engine operating condition and detecting a power-on transition, at which an engine load is abruptly increased from a condition satisfying a predetermined fuel cut-off condition;

third means responsive to detection of said power-on transition for deriving a transmission shifting timing;

fourth means responsive to detection of said power-on transition for deriving a fuel recovery timing;

fifth means for providing a delay time at least for said fuel recovery timing delayed from the detection of said power-on transition for a predetermined delay period derived on the basis of said reference response delay period, for synchronizing said fuel recovery timing with said transmission shifting timing; and sixth means for deriving an error between said transmission shifting timing and said fuel recovery timing for modifying said reference response delay period for maintaining said error within a predetermined allowable range.

11. A shift shock reducing system as set forth in claim 10, wherein said first means varies said reference response delay period depending upon the speed ratio of said transmission.

* * * * *